J. Lemman,
Mortising Machine.

N° 35,318.           Patented May 20, 1862.

Witnesses.

Inventor.

UNITED STATES PATENT OFFICE.

JOHN LEMMAN, OF CINCINNATI, OHIO.

IMPROVED MORTISING-MACHINE.

Specification forming part of Letters Patent No. 35,318, dated May 20, 1862.

*To all whom it may concern:*

Be it known that I, JOHN LEMMAN, of Cincinnati, Hamilton county, Ohio, have invented a new and useful Improvement in Mortising-Machines; and I do hereby declare the following to be a full, clear, and exact description thereof, reference being had to the annexed drawings, making part of this specification.

This invention relates to an adjustable provision for cutting mortises of any desired upward or downward curve or perfectly straight, or for boring one or more round holes either in straight or curved lines, and the invention is particularly designed for making the curved and other mortises of chair-stuff.

Figure 2:
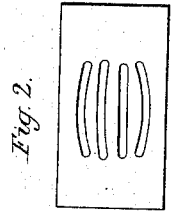
Figure 1:
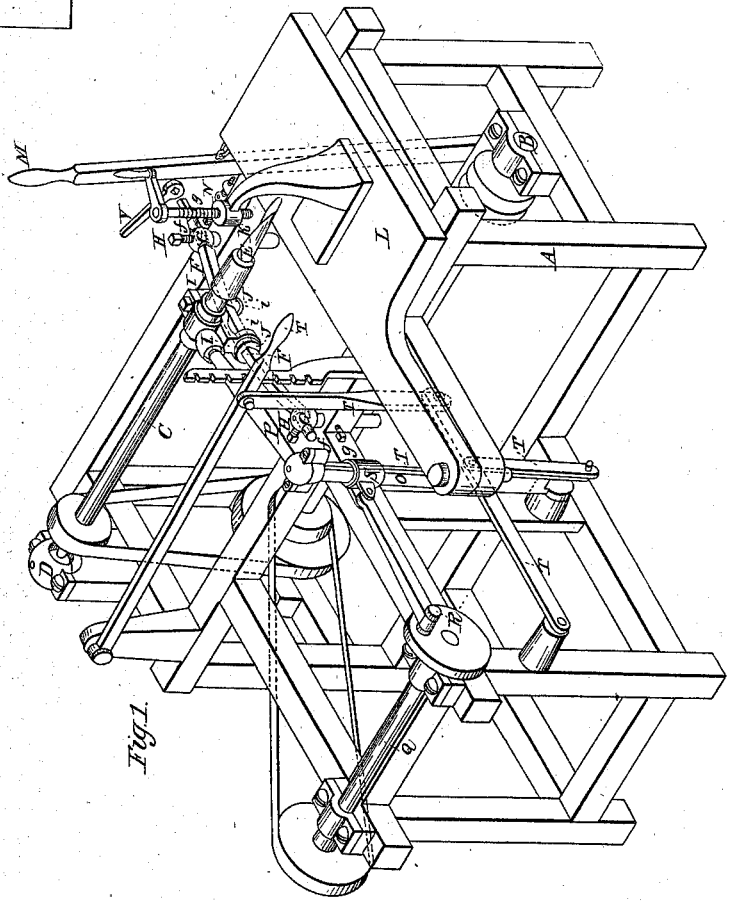

Figure 1 is a perspective view of a machine embodying my improvement. Fig. 2 represents a variety of mortises formed by such machine.

A is a frame.

B is a driving-shaft, which is belted to a vibratable mandrel or shaft, C, whose rear or fixed end is journaled to the frame by a ball-joint, D, and whose front or vibrating end carries a pod-bit, E, and is supported and guided in its desired path by means of the following arrangement:

F is a circular arc or guide-bar, of iron or steel, terminating in journals $f$, coincident with the chord of said arc. The journals $f$ are supported in heads G G', which may be slid up and down and secured at any desired height by set-screws $g$.

The arc F may be set for an upward or a downward mortise of any desired camber, or for a straight mortise, by partially revolving it upon its journals, and then fixing it rigidly in position by means of set-screws H.

I is a plumber-block boxed at its upper part to afford journal-bearing to the forward portion of the mandrel, and terminating below in circular sockets $i$, containing sleeves J, adapted to slide upon and vibrate with the arc F.

K is a clamp supported upon a sliding rest, L, which is fed toward the bit by means of a lever, M.

N is an adjustable stop to regulate the depth of the feed.

When a round hole merely is desired, the only mandrel motion necessary is a simple rotary one; but for a curved or a rectilinear slot or mortise the mandrel requires during rotation to be slid to and fro along the arc F. This movement may be effected as follows:

O is a rock-arm, whose upper or free extremity connects with the block I by means of a pitman, P, having a ball-joint at each end. A shaft, Q, driven by belt from the driving-shaft, carries a wrist, R, which pitmans to sleeve S, adapted to be slid up or down while the machine is in action, by a suit of levers and rods, T, which may be held to any desired point of adjustment by a rack, U, according to the length of mortise desired.

V is a key for operating the arc F and the various set-screws.

Operation: For an arched mortise or row of holes of equal camber or radius to the guide-bar the latter is set in a vertical plane and with its apex upward or downward according to the direction desired for the curve. For any flatter curve between the above extremes the arc is inclined more or less forward, while for a straight mortise or row of holes the arc is fixed in a horizontal plane. The arc having been adjusted to the proper angle or inclination the heads G G' are so raised or lowered as to bring the mandrel to a horizontal position.

I claim as new and of my invention—

The mode of supporting and guiding the mandrel on the curved bar F, adapted for vertical and angular adjustment, substantially as and for the purposes set forth.

In testimony of which invention I hereunto set my hand.

JOHN LEMMAN.

Witnesses:
GEO. H. KNIGHT,
W. F. HURLBUT.